United States Patent [19]

Froeschke et al.

[11] Patent Number: 5,591,458
[45] Date of Patent: Jan. 7, 1997

[54] APPARATUS FOR MANUFACTURING GRANULATED MATERIAL

[75] Inventors: Reinhard Froeschke, Weinstadt-Beutelsbach; Axel König, Stuttgart, both of Germany

[73] Assignee: Santrade Ltd., Lucerne, Switzerland

[21] Appl. No.: 446,780

[22] PCT Filed: Aug. 5, 1994

[86] PCT No.: PCT/EP94/02607

§ 371 Date: Jul. 24, 1995

§ 102(e) Date: Jul. 24, 1995

[87] PCT Pub. No.: WO95/09045

PCT Pub. Date: Apr. 6, 1995

[30] Foreign Application Priority Data

Sep. 28, 1993 [DE] Germany ............... 43 32 952.7

[51] Int. Cl.⁶ .................................................. B29B 9/10
[52] U.S. Cl. ............................. 425/6; 425/188; 425/381; 425/466; 425/DIG. 230; 264/8; 264/142; 264/176.1; 425/215
[58] Field of Search ................................ 425/188, 72.2, 425/466, DIG. 230, 381, 215; 264/176.1, 142, 8

[56] References Cited

U.S. PATENT DOCUMENTS

| | | |
|---|---|---|
| 3,233,022 | 2/1966 | Henry et al. |
| 3,680,994 | 8/1972 | Longenecker ............... 425/188 |
| 4,248,581 | 2/1981 | Harrison ............... 425/72.2 |
| 4,372,739 | 2/1983 | Vetter et al. ............... 264/176.1 |
| 4,413,971 | 11/1983 | Nettleton ............... 264/142 |
| 4,479,768 | 10/1984 | Kube et al. ............... 425/466 |
| 4,559,000 | 12/1985 | Froeschke . |
| 4,610,615 | 9/1986 | Froeschke ............... 425/DIG. 230 |
| 5,378,132 | 1/1995 | Kaiser . |

FOREIGN PATENT DOCUMENTS

| | | |
|---|---|---|
| 1150050 | 6/1963 | Germany . |
| 2000283 | 7/1970 | Germany . |
| 3624611 | 1/1988 | Germany . |

Primary Examiner—James P. Mackey
Assistant Examiner—Iurie A. Schwartz
Attorney, Agent, or Firm—Burns, Doane, Swecker & Mathis, L.L.P.

[57] ABSTRACT

A mechanism for making granulated material from a viscous substance includes a vessel charged with the substance and having a discharge opening arrangement for discharging the substance onto a cooling surface. A belt travels across the vessel, the belt having openings arranged to periodically come into alignment with the discharge opening arrangement to allow the substance to fall onto the cooling surface. The discharge opening arrangement comprises a plurality of rows of discharge openings. Each row extends transversely of the longitudinal direction of belt travel, and the rows are spaced apart in that longitudinal direction. The vessel openings of each row are offset in the transverse direction with respect to the vessel openings of other rows. A collection arrangement collects residual substance falling from the belt and returns the substance onto the belt at a location upstream of the vessel.

20 Claims, 3 Drawing Sheets 5,591,458

1

APPARATUS FOR MANUFACTURING GRANULATED MATERIAL

BACKGROUND OF THE INVENTION

The invention refers to an apparatus for manufacturing granulated material from free-flowing viscous substances that are made into drops and solidify or gel, consisting of a vessel, charged with the free-flowing substance, with a discharge opening arrangement that is intermittently opened or closed by a perforated belt that is periodically moved therepast.

An apparatus of this kind, in which a continuous slit, against whose lateral delimiting walls the perforated belt lies, is provided as the discharge opening arrangement of a tubular vessel, is known from EP 0 134 944 B1. The slit, running transverse to the belt travel direction, must have a certain width (i.e. a dimension in the direction of belt travel) in order to give the openings of the belt, as they move past it, time to fill up with the substance being formed into drops and then deliver it in portions onto a cooling belt located therebelow. Especially when comparatively viscous substances, which enter the slit space under pressure, need to be formed into drops, this can cause the force resulting from the slit area and the pressure to become so great that the belt being guided past the lateral delimiting walls of the slit is pushed outward (downward), so that in an undesirable manner, additional material becomes distributed spread on the side of the belt facing the vessel.

The underlying object of the invention is to provide a remedy for this, and to propose a capability that, guarantees that the belt lies as closely as possible against the outer surface of the vessel, without adversely affecting the apparatus.

SUMMARY OF THE INVENTION

The invention proceeds from the consideration that it is not possible to reduce the width of the slit, especially at high production rates i.e., at high relative velocities between the perforated belt and the vessel, since then the perforation openings in the belt do not fill up with the material in the desired manner due to the short filling time available to them. The invention involves the outflow openings being formed by a plurality of rows of openings, the rows arranged transverse to the travel direction of the belt. The openings are preferably offset from one another so that their cross-sectional area over which the perforation openings of the belt travel is always the same size regardless of the position of the movement track of the perforation openings. This embodiment possesses on the one hand the advantage that the total area of the discharge openings of the vessel is reduced, so that the force acting on the belt is also decreased, but on the other hand that because the openings in the vessel are arranged one behind another, enough time is available for the perforation openings in the belt, as they travel past the various rows of openings, to be sufficiently filled with material for the purpose of forming drops.

The embodiment according to the invention also, however, possesses the advantage that despite the arrangement of rows of openings, there is no danger that, if the perforated belt (which in operation can never be guided exactly in the travel direction) runs off centre, the same quantity of the substance being formed into drops will always enter the perforation openings of the belt, which of course is always the case with a slit extending transverse to the belt travel direction. Because of the arrangement of the openings according to the invention, the rows of individual openings acting as outflow openings function in the same way as a continuous slit.

In a development of the invention, all the openings can be of the same size, and their periphery can possess a common tangent with openings in other rows. This provides assurance that regardless of the travel direction of the perforation openings, the same cross-sectional area is always being traveled over, so that even if the travel direction of the perforated belt deviates laterally, there is no danger that too little material will enter the perforation openings. Of course the absolute size of the diameter of the holes, although they are the same size as one another, is adapted in each case to the properties of the material being formed into drops. The diameter of the openings lying in the belt travel direction can, however, also be adapted differently and, for example, to a predefined size distribution. This makes it possible to influence the size, shape, and crystallinity of the pellets.

In an embodiment of this kind, it has also proven to be very advantageous if the total open cross section of the openings can be adjusted by means of at least one slider arranged in the vessel which advantageously lies against the inner wall of the vessel. Specifically, this embodiment makes it possible to regulate the entire discharge volume and to achieve adaptation to the belt travel velocity which depends on the production rate.

In a development of the invention, advantageous provision is made, in an apparatus of the aforesaid kind with a vessel with a convex outer surface lying against the belt, for the front edge of the outer surface pointing away from the belt travel direction to be configured as a kind of infeed funnel. In a further embodiment, the outer surface can also possess a different curvature in the belt travel direction; and lastly, the entire vessel can be arranged pivotably. With these features the guidance of the perforated belt can be changed so that it also becomes possible to vary the spacing and the position of the perforated belt to a certain extent with respect to the cooling belt below it. It has been found that this is advantageous for drop formation and for properly timed release of the drops, especially at high production rates. Configuring the front edge in the manner of an infeed funnel ensures that any material which may still be adhering to the inner surface of the belt is pushed into the perforation openings.

In order to prevent, from the outset, uncontrolled wetting by material dropping down from the inside of the perforated belt from the upper run, in an apparatus of the aforesaid kind with an endless perforated belt against whose lower run the vessel sits, provision is made for collection panels leading to a central collection trough to be arranged under the upper run. A collecting apparatus for substance adhering to the outside of the band, connected in turn to the collection trough, can additionally be associated with the reversing drum lying behind the vessel in the belt travel direction. In another embodiment, however, provision can also be made for this reversing drum to be closely surrounded by a directing device in its entire outer reversing region. As a result, any material that may adhere to the outside of the belt is guided, in the manner of a cellular wheel whose cells are formed by the perforation openings of the belt, in the region of the upper run of the belt, from whence the substance can then drop onto the collection panels.

In all embodiments, it is advantageous if the collection trough is arranged directly before the vessel in the belt travel direction and is provided with a discharge opening directed downward. In this manner, material taken from the collection panels and, if applicable, from the collection device associated with the reversing drum, can reach the inner surface of the belt shortly before the vessel, be pushed from the outer surface of the vessel into the perforation openings, and can then, together with the material emerging from the other openings of the vessel, drop downward. It is self-evident that the collection panels, the collection trough, and the collection apparatus or directing device are suitably heated in order to maintain the flow capability of the material. Lastly, the outer surface of the collection trough, associated with the belt, can also be tilted away from the travel direction and can be configured in the manner of a wiper, so that material coming from the collection trough can already be pushed into the perforation openings at this point.

A wiper, in the region of which a scraper resting against the inner surface of the upper run and lying over one of the collection panels is provided, can also be associated with the upper run of the recirculating belt. This feature again ensures that undesired sticking of the belt is prevented.

Lastly, advantageous provision is also made for both reversing drums to be driven synchronously. In the known device only one reversing drum has been driven, and it has been assumed that the second reversing drum, in front in the travel direction of the cooling belt arranged under the continuous belt, is entrained by the perforated belt. It has been found, however, that despite all additional features it is not possible entirely to prevent the inner surface of the recirculating perforated belt from possessing a layer of the material being formed into drops. This can cause slippage the belt on the second reversing drum if the latter is not driven.

BRIEF DESCRIPTION OF THE DRAWINGS

The invention is depicted in the drawings with reference to exemplary embodiments, and will be explained below. In the drawings.

DETAILED DESCRIPTION OF PREFERRED EMBODIMENTS OF THE INVENTION

Figure 1:
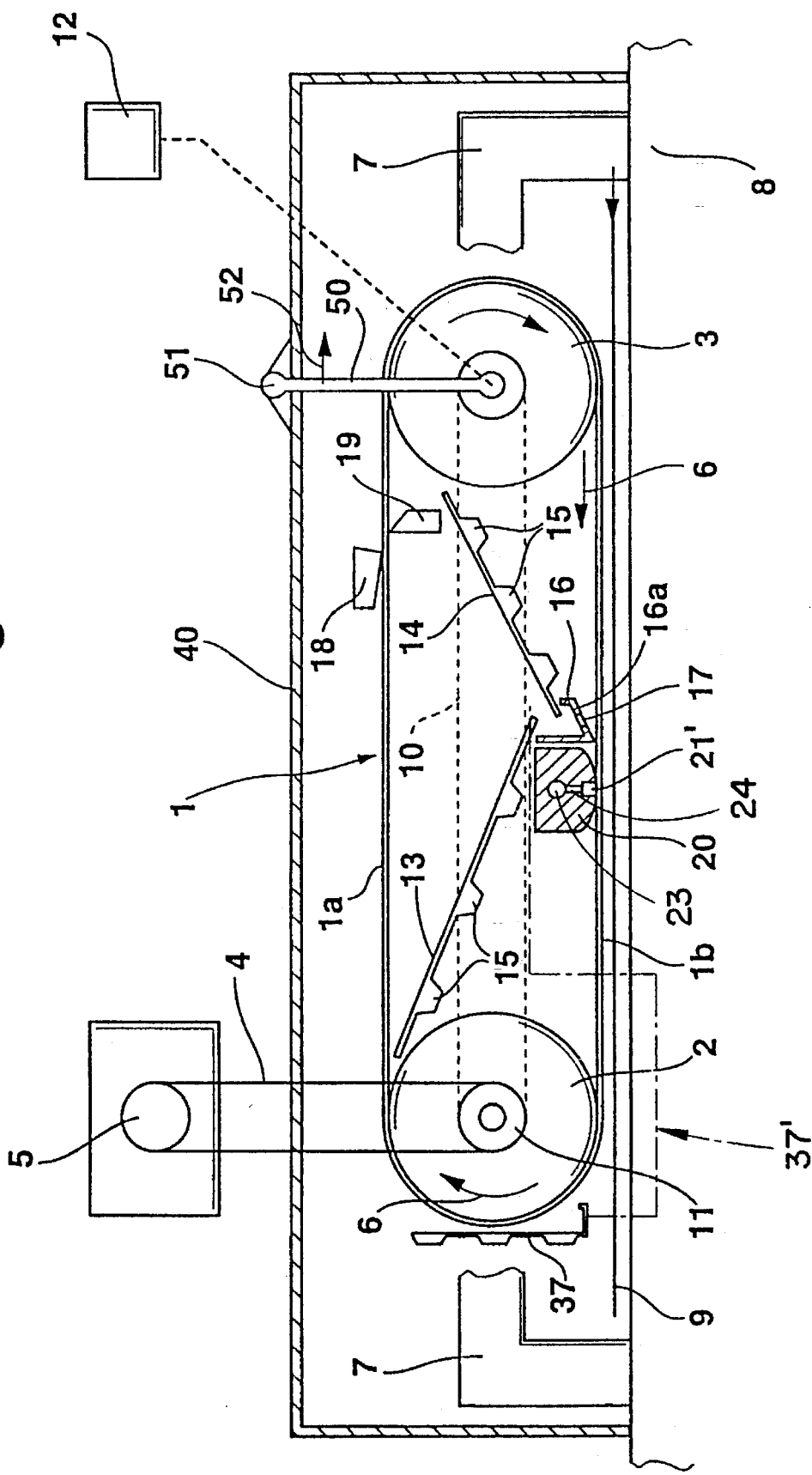
FIG. 1 shows a schematic vertical sectional view of a belt drop former according to the invention.

FIG. 1 shows a so-called belt drop former that possesses a continuously recirculating perforated belt (1) which is guided around two reversing drums (2 and 3). The reversing drum (2) is driven by means of a drive belt or chain (4) by a drive motor (5). Travel of the belt (1) occurs in the direction of the arrow (6). The reversing drums (2) of the drive system are mounted in a support frame (7), indicated only schematically, that in turn is applied to a frame (8), again shown only schematically, which receives the guide devices for a cooling device that, in the exemplary embodiment, consists of a cooling belt (9). The cooling belt (9) is advantageously a steel belt that runs at the same velocity as the lower run (1b) of the perforated belt (1).

In the embodiment depicted, the reversing drum (3) is also driven synchronously with the reversing drum (2), which occurs by means of a connecting chain or connecting belt (10) from a pinion (11) immovably joined to the reversing drum (2). The rotation speed of the reversing drum (3) can be detected by means of known devices and analysed in a control device (12), which in turn controls the drive for the perforated belt (1). The belt (1) is tensioned by the fact that the reversing drum (3) is mounted at the lower end of a pivot arm (50) whose pivot axis (51) is arranged outside an extraction hood (40) surrounding the belt (1). In this manner, aggressive vapours are kept away from the location of the pivot axis (51). The pivot arm is acted upon by a tension force of the belt (1) which acts in the direction of the arrow (52).

Provided inside the continuously recirculating belt (1) are two inclined collection panels (13 and 14) that, in the disclosed embodiment, are each provided with downward-pointing protrusions that form channels (15) through which a heating medium can be passed in order to control the temperature of the collection panels (13 and 14). The collection panel (13) extends obliquely downward, proceeding approximately tangentially to the reversing drum (2), and the collection panel (14) also extends downward, approximately tangentially to the top of the reversing drum (3). The collection panels (13 and 14) therefore form together a V-shape and their lowest ends are disposed, above a collection trough (16) that runs transverse to the lower run (1b) of the belt (1) and is provided in this direction with a discharge slit (17) or with a plurality of discharge openings arranged in a row. The underside (16a) of the collection trough (16) extends obliquely upward away from the travel direction of the lower run (1b), so that the underside (16a) acts in the manner of a spatula on the material arriving from the collection panels (13 and 14) and emerging downward through the slit (17) to push that material into the perforation openings (22) of the belt (1), which are visible in FIGS. 2 and 5. Associated with the lower run (1a) of the belt (1) and disposed above the collection panel (14) are a directing device (18) and a scraper (19) which contact the outer and inner sides, respectively, of the belt (1). The device (18) pushes material downwardly through the openings (22), and the scraper scrapes material off the inner side of the belt (1). Hence, the devices (18, 19) ensure that excess material still present on the belt (1) is removed as completely as possible and directed to the collection panel (14).

Figure 2:
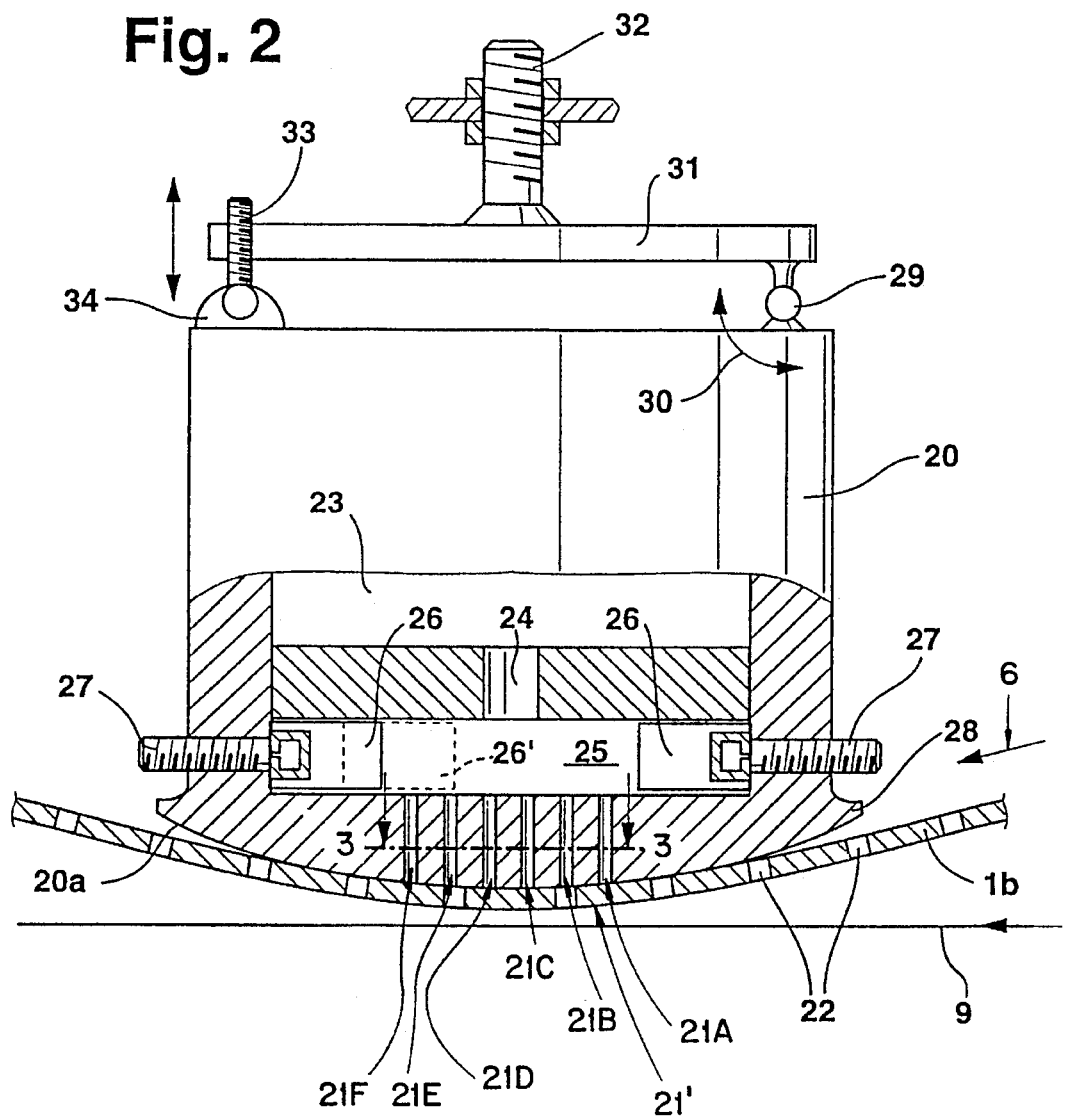
FIG. 2 shows an enlarged depiction of a portion of the device of FIG. 1, showing a vessel thereof which is to be charged with the substance to be formed into drops.
Figure 3:
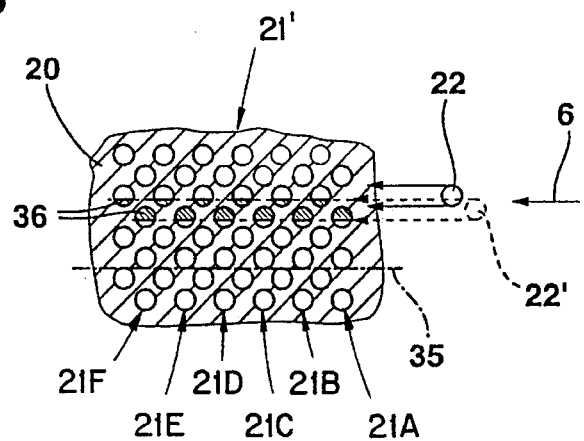
FIG. 3 shows a partial section through the outflow region of a vessel of FIG. 2, with the allocation to the perforation openings of the belt moving past it, in a schematic depiction.

The lower run (1b) lies against a vessel (20), extending transverse to the travel direction of the belt (1), whose configuration is evident from FIGS. 2 and 3. The material being formed into drops is, in a conventional manner, delivered to one end of the vessel (20), in a heated, free-flowing state and then passes, at the underside of the vessel (20), through a discharge opening arrangement (21') comprised of an interrupted slit formed by spaced discharge openings (21) provided in the vessel (20). The material from those openings passes through the perforation openings (22) of the belt (1) so as to fall, in the form of drops, onto the cooling belt (9) where the drops then solidify or gel. That is, the prior art transverse slit has been replaced by openings (21) spaced apart in the longitudinal direction of belt travel as shown in FIG. 2. Thus, each belt opening (22) is gradually filled with material as it traversed the openings (21).

FIG. 2 illustrates that the vessel (20) is configured as a hollow profile which forms an inflow channel (23) through which the material passes into openings (24) distributed over the length of the vessel and into a distribution space (25), from which the supplied material is pushed downward through a plurality of rows (21A–21F) of the openings (21) arranged with equal spacing one behind another in the travel direction of the lower run (1b). There the drop formation process occurs by the fact that the openings (22) of the belt (1) move in succession past the openings (21) of the various rows. As FIG. 2 shows, a valve mechanism in the form of slider plates (26) is provided in the distribution space (25), and each plate (26) can be displaced by means of threaded spindles (27) from solid line positions to broken-line positions (26') overlying one or more of the openings (21), so that one or more of the rows (21A–F) of openings (21) can be selectively closed off in order to allow an adjustment of the product volume supplied to the desired drop formation process and production rate. A lower surface (20a) of the hollow vessel (20) has, on its inlet or upstream side facing opposite the belt travel direction, a nose-like projection (28) that, together with the lower run (1b), forms a kind of infeed funnel (i.e., a gap of gradually decreasing height) which ensures that the material delivered from the collection trough (16) is also pushed into the perforation openings (22) of the belt (1) as the belt (1) and vessel (20) move relative to one another.

The lower surface (20a) of the vessel profile (20) is convex in shape and can be configured so that a portion thereof disposed downstream (i.e., to the left) of the nose (28) possesses a different profile i.e. a different elevation relative to that of the lead-in nose (28). In this way, the applied pressure conditions between the belt (1) and the vessel (20) can be changed. The same purpose would also be served by a pivotable suspension of the entire vessel (20). FIG. 2 shows that the vessel profile (20) is arranged pivotably in the direction of arrow (30) about a pivot axis (29). This is achieved by the fact that the pivot axis (29)is attached to a support (31) that is joined immovably by means of one or more fastening bolts (32) to the support frame (7) for the belt drop former. The support (31) possesses, at its end facing away from the pivot axis (29), threads into which engages a threaded bolt (33) that is mounted rotatably at its lower end in a spherical mount (34) which is joined immovably to the vessel (20). Thus when the threaded bolt (33) is rotated, the distance between the support (31) and vessel (20) can be changed. The vessel (20) pivots in the direction of arrow (30) about the axis (29). This feature also makes it possible to change the contact characteristics between the belt (1) and the lower side (20a) of the vessel. This embodiment makes it possible to set the best conditions for drop formation between the belt (1) and the vessel (20) depending on the type of material and consistency, or on the relative velocity.

FIG. 3, which shows a portion of the arrangement of the openings (21) of the vessel (20), illustrates that the individual openings (21) in the rows lying one behind another in the travel direction (6) of the belt (1) are arranged at an offset to one another. In the disclosed embodiment, this is achieved by the fact that the openings (21) of the second and fourth rows are offset with respect to the openings (21) of the first and second rows, in each case by one full opening diameter (21). A tangent (35) drawn to the periphery of the openings (21) and extending in the belt travel direction (6) therefore also forms a tangent with the peripheries of the openings (21) arranged in offset fashion in the subsequent rows. The result of this arrangement is that one of the openings (22) in the belt (1), as indicated schematically, completely traverses in succession the openings of the first and third rows, and possibly of further rows. As the belt (1) passes over the rows (21), the openings (22) can fill up in the desired manner with the material being formed into drops, and discharge that material downward.

This exact alignment of the openings (22) in the belt travel direction with respect to the openings (21) cannot, however, be maintained in practice, since exact guidance of the belt (1) in its travel direction is not possible. The openings (22) will therefore also deviate to some extent laterally from their movement track defined in the travel direction (6), and may for example occupy the broken line position marked (22') in FIG. 3. In the position (22') the opening (22) travels across a portion of the cross section of the openings (21) that are transversely adjacent to the direction of travel, in a manner such that the total cross-sectional area (36) traveled over, indicated by cross-hatching, again corresponds to the cross-sectional area that the opening (22) passed over when traveling (in the solid line position) over the two openings (21) lying one behind another. Stated another way, the distance of the transverse offset between two rows is such that any part of a belt opening which is disposed transversely outwardly with respect to a transverse edge of a vessel opening of one of the rows at the instant that it is passing one of the other rows, must travel across an opening of the other row.

With this embodiment and arrangement, therefore, the same volume of material being formed into drops always passes into the openings (22), regardless of the alignment thereof in the travel direction (6) with respect to the openings (21). This allows a departure from the arrangement, known in the prior art, of a continuous slit as the outflow opening. The total area of the openings (21) can extend to a sufficient extent in the travel direction of the belt that enough time is available for the openings (22) to fill with material. On the other hand, the cross-sectional area (i.e. the number of holes 21 being utilized) can be substantially less and can be adapted to the particular application by shifting the slider plates (16). The force occurring between the hollow vessel (20) and the belt (1), which results from the pressure of the material being formed into drops in the space (25) and the total cross-sectional area of the openings (21), can therefore be modified so that the belt (1) is always guided sufficiently close to the outer surface (20a).

In the embodiment of FIGS. 2 and 3, the openings (21) are all the same size as one another. Of course their diameter is determined on the basis of the nature and viscosity of the material being formed into drops.

It is also possible, however, to configure the openings (21) lying one behind another in the belt travel direction (6) with different sizes. In each row lying perpendicular to the belt travel direction (6) all the openings will be of the same size, and they are also the same size as one another in the next offset row, but different compared to the openings of the next non-offset row.

Thus it is possible, for example, that the openings (21) lying one behind another in the belt travel direction (6) become continually larger in diameter. The quantity of material from opening (21A) formed into drops on the belt (1) is therefore initially small, and cools rapidly before the arrival of the next partial volume from the following openings makes it possible to influence crystallisation advantageously. It is possible in this manner, through the configuration of the size of the openings, to influence the crystallinity of the product.

The embodiment of FIG. 1 possesses, in the reversing region of drum (2), a collection apparatus (37) arranged next to the outer surface of belt (1) for collecting the residual material emerging from the openings (22) in the reversing region. This collection apparatus is also heated, and is connected via conduit 57' to the collection trough (16) in such a way that material collected by the collection apparatus (37) also arrives at the collection trough (16).

Figure 4:
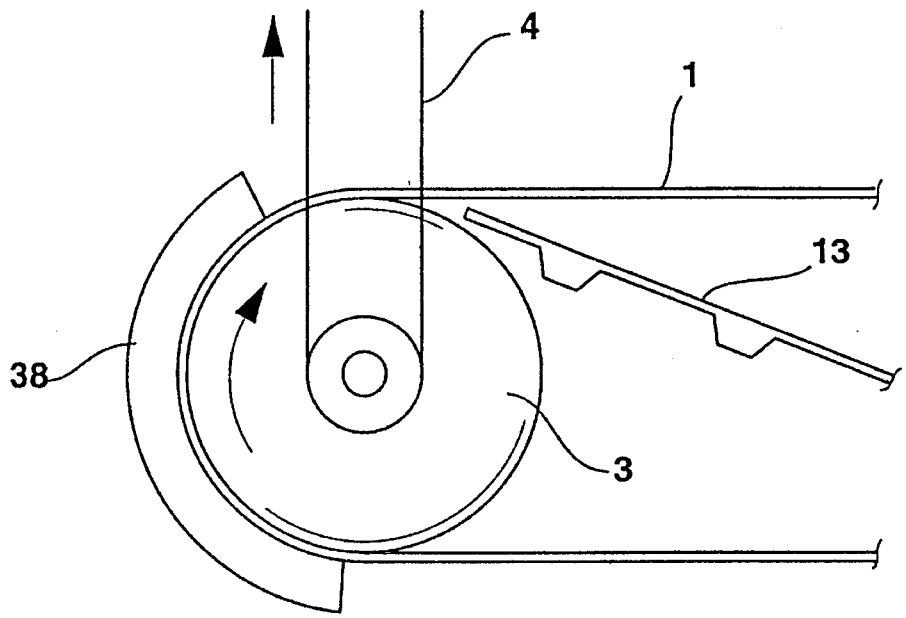
FIG. 4 shows a partial depiction of the left reversing drum of the device of FIG. 1 with a directing device cooperating therewith.
Figure 5:
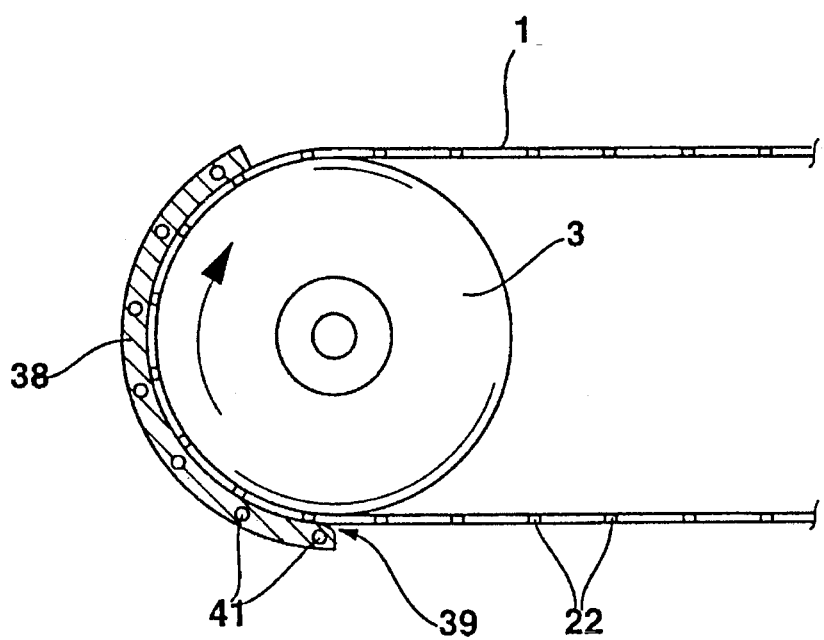
FIG. 5 shows a section through the reversing drum of FIG. 4.

The embodiment of FIGS. 4 and 5 shows a variant of such a collection apparatus. Here a directing device (38) in the form of a half-shell is associated with the reversing drum (3) in the reversing region, and together with the recirculating belt (1) prevents material from dropping off at the reversing point and, in the manner of a cellular wheel (see FIG. 5), ensures that material still present in the openings (22) is guided to the upper run of the belt (1), where it can then drop off onto the collection panels (13 and 14).

Lastly, FIG. 1 shows that the entire device (the belt drop former) is enclosed by a covering hood (40) which can be heated and which ensures that even in the region of the upper run (1a), a sufficient temperature prevails either to allow material to drop off or to create the possibility for it to be brought by means of the directing device (18) and/or the scraper (19) onto the collection panel (14). This is important in order to prevent clogging, which might for example result from partly solidified material still remaining in the openings (22) when they again pass over the openings (21). Vapours can also be extracted through the hood.

As FIG. 5 shows, the directing device (38) is provided with an infeed nose (39) and with heating devices configured in a known manner as channels (41), that ensure temperature control for it.

We claim:

1. Apparatus for manufacturing granulated material from a free-flowing viscous substance that is made into drops which solidify or gel, comprising:

a vessel charged with the free-flowing substance and having a discharge opening arrangement for discharging the substance; and a belt perforated by openings and arranged to move across the discharge opening arrangement so that the belt openings periodically come into alignment with the discharge opening arrangement to open the latter and permit the free-flowing substance to flow therethrough;

the discharge opening arrangement comprising a plurality of rows of vessel openings, each row extending transversely of a longitudinal direction of belt travel across the vessel, the rows being spaced apart in the longitudinal direction of belt travel, the vessel openings of one row being offset by a transverse distance with respect to the vessel openings of at least one other row, the distance being such that any part of a belt opening disposed transversely outwardly with respect to a transverse edge of a vessel opening of the one row at the instant it passes the other row must travel across an opening of the other row.

2. The apparatus according to claim 1, wherein all of the vessel openings are of the same size, and the vessel openings of each row have their centers aligned with the centers of the vessel openings of at least one other row, the alignment being in the longitudinal direction.

3. The apparatus according to claim 1, wherein the vessel openings of at least one of the rows are of different size than the vessel openings of at least one other row.

4. The apparatus according to claim 1, wherein the vessel openings have circular cross sections.

5. The apparatus according to claim 1, wherein said vessel openings include inlet ends for receiving the substance, and further including a valve mechanism for closing a selected number of those inlet ends.

6. The apparatus according to claim 5, wherein said vessel includes a substance-conducting space communicating with all of said inlet ends, the valve mechanism including at least one slide arranged to be adjustably within the space to cover-up selected number of the inlet ends.

7. The apparatus according to claim 1, wherein the vessel includes a generally convex surface against which the belt engages, the convex surface including upstream and downstream ends with reference to belt travel, the upstream end disposed higher than a center portion of the convex surface and spaced above the belt to form therewith a gap having a height which progressively decreases in a downstream direction.

8. The apparatus according to claim 7, wherein the curvature of an upstream portion of the convex surface is different than a portion of the convex surface disposed downstream of the upstream portion.

9. The apparatus according to claim 7 further including a frame, the vessel being pivotably mounted to the frame for adjustment about a horizontal axis extending transversely relative to a direction of travel of the belt across the vessel.

10. The apparatus according to claim 1, wherein the belt includes upper and lower runs, the lower run engaging the vessel, a collecting panel arrangement disposed beneath the upper run for guiding residual substance dripping from the upper run, and a collection trough arranged to receive substance guided by the collecting panel arrangement.

11. The apparatus according to claim 10 further including a reversing drum about which a downstream end of the lower run travels, a collector arranged to collect residual substance falling from the belt as it traverses the reversing drum, the collector communicating with the collection trough for delivering substance thereto.

12. The apparatus according to claim 10 further including a reversing drum about which a downstream end of the lower run travels, a curved directing device arranged to bear against an outer surface of the belt traveling along the reversing drum to prevent the escape of substance from the belt openings until the belt emerges from the directing device as the upper run.

13. The apparatus according to claim 10, wherein the collecting trough is arranged to deposit substance on the belt upstream of the vessel.

14. The apparatus according to claim 13, wherein the collection trough is disposed upstream of the vessel and above the lower run, the collection trough including an upstream wall arranged to form with the lower run a gap having a height which progressively decreases in the downstream direction.

15. The apparatus according to claim 10 including a wiper arranged over the upper run to push residual substance downwardly through the upper run and onto the collection panel arrangement.

16. The apparatus according to claim 10 further including a scraper disposed beneath the upper run for scraping residual substance therefrom and onto the collection panel arrangement.

17. The apparatus according to claim 10, wherein the collection trough is heated.

18. The apparatus according to claim 1, further including upstream and downstream reversing drums about which the belt travels, both reversing drums being driven synchronously.

19. The apparatus according to claim 1, further including upstream and downstream reversing drums about which the belt travels, one of the reversing drums being mounted at an end of a pivot arm for adjustment toward and away from the other reversing drum for adjusting belt tension.

20. The apparatus according to claim 1, wherein the openings of all rows are circular and of the same diameter and arranged such that lines extending tangent to respective openings of the one row and parallel to the direction of belt travel are also tangent to respective openings of the other row.

* * * * *